United States Patent
Cai et al.

(10) Patent No.: US 11,349,997 B2
(45) Date of Patent: May 31, 2022

(54) QUOTA MANAGEMENT IN A SESSION MANAGEMENT FUNCTION (SMF) FOR ONLINE CHARGING

(71) Applicant: Nokia Solutions and Networks Oy, Espoo (FI)

(72) Inventors: Yigang Cai, Naperville, IL (US); Ranjan Sharma, New Albany, OH (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/978,437

(22) PCT Filed: Mar. 20, 2018

(86) PCT No.: PCT/US2018/023398
§ 371 (c)(1),
(2) Date: Sep. 4, 2020

(87) PCT Pub. No.: WO2019/182572
PCT Pub. Date: Sep. 26, 2019

(65) Prior Publication Data
US 2021/0051235 A1    Feb. 18, 2021

(51) Int. Cl.
*H04M 15/00*       (2006.01)
*H04L 41/0893*   (2022.01)
(Continued)

(52) U.S. Cl.
CPC ........ *H04M 15/66* (2013.01); *H04L 41/0893* (2013.01); *H04M 15/16* (2013.01);
(Continued)

(58) Field of Classification Search
CPC ...... H04M 15/66; H04M 15/16; H04M 15/64; H04M 15/8228; H04L 41/0893; H04W 4/24; H04W 48/18
(Continued)

(56) References Cited

U.S. PATENT DOCUMENTS

2012/0184244 A1*  7/2012  Cai ................... H04M 15/8228
                                                            455/408
2019/0053104 A1*  2/2019  Qiao ...................... H04L 47/20
(Continued)

OTHER PUBLICATIONS

"3rd Generation Partnership Project; Technical Specification Group Services and System Aspects; Telecommunication management; Charging management; Study on charging aspects of 5G system architecture phase 1 (Release 15)", 3GPP, V15.0.0, Jan. 4, 2018 (Jan. 4, 2018), pp. 1-104. (Year: 2018).*

*Primary Examiner* — Mong-Thuy T Tran
(74) *Attorney, Agent, or Firm* — Duft & Bornsen, PC

(57) ABSTRACT

Systems, methods, and software for performing online charging in next generation networks. In one embodiment, a Session Management Function (SMF) of a next generation network implements a Charging Trigger Function (CTF) that directly interfaces with an Online Charging System (OCS). The CTF transmits a charging request to the OCS requesting a quota of service units for the SMF, and receives a charging response from the OCS indicating the quota of service units granted to the SMF by the OCS. The CTF then manages the quota by allocating slices of the quota to User Plane Functions (UPF) implemented in a user plane of the next generation network.

20 Claims, 8 Drawing Sheets

(51) Int. Cl.
  *H04M 15/16* (2006.01)
  *H04W 4/24* (2018.01)
  *H04W 48/18* (2009.01)

(52) U.S. Cl.
  CPC ....... *H04M 15/64* (2013.01); *H04M 15/8228* (2013.01); *H04W 4/24* (2013.01); *H04W 48/18* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2019/0357130 A1* | 11/2019 | Garcia Azorero .... | H04W 48/18 |
| 2020/0092423 A1* | 3/2020 | Qiao ..................... | H04M 15/66 |
| 2020/0100075 A1* | 3/2020 | Chai ..................... | H04W 80/10 |
| 2020/0169639 A1* | 5/2020 | Chai ..................... | H04M 15/64 |
| 2020/0228942 A1* | 7/2020 | Chai ................... | H04M 15/785 |
| 2020/0389844 A1* | 12/2020 | Bihannic .............. | H04L 41/5041 |
| 2020/0404467 A1* | 12/2020 | Yang .................... | H04M 15/854 |
| 2021/0136235 A1* | 5/2021 | Yang ....................... | H04W 4/24 |

\* cited by examiner

QUOTA MANAGEMENT IN A SESSION MANAGEMENT FUNCTION (SMF) FOR ONLINE CHARGING

RELATED APPLICATIONS

The present application is a National Stage entry of PCT application No. PCT/US2018/023398 filed on Mar. 20, 2018, which is fully incorporated herein by reference.

TECHNICAL FIELD

This disclosure is related to the field of communication systems and, in particular, to credit control for online charging.

BACKGROUND

Service providers or carriers typically offer numerous voice and data services to end users of mobile phones or other mobile terminals. Some examples of voice services are voice calls, call forwarding, call waiting, etc. Some examples of data services are Internet access, streaming audio, streaming video, online gaming, Internet Protocol television (IP-TV), etc. A "carrier" is a term commonly used in the United States and Canada to refer to a company that provides these types of voice or data services. Examples of carriers include Verizon Wireless®, T-Mobile®, AT&T®, etc.

The first types of wireless or mobile networks that were introduced by carriers were First Generation (1G) and Second Generation (2G) networks. 1G networks provided voice services via analog signals, and then evolved into 2G networks that provided voice services via digital signals. Mobile communications then evolved into Third Generation (3G) (including 2.5G) networks that provided both voice services and data services. For example, 3G networks are able to provide wireless voice telephony, as well as data services such as Internet access, video calls, mobile TV, etc. Some of the 3G networks implemented by carriers were Universal Mobile Telecommunications System (UMTS) networks, Enhanced Voice Data Optimized (EV-DO) networks, General Packet Radio Service (GPRS) networks, etc. Mobile communications then evolved into Fourth Generation (4G) technologies over Packet-Switched (PS) networks, such as Long Term Evolution (LTE). 4G networks are essentially enhancements to 3G networks in terms of data speeds. For example, a 3G network can provide data speeds of about 3.5 Mbit/sec, while a 4G network can provide data speeds of 100 Mbit/sec. Next generation networks, such as Fifth Generation (5G), denotes the next major phase of mobile telecommunications standards beyond the current 4G standards. In addition to faster speeds, next generation networks will need to meet new use cases in terms of latency, throughput, capacity, and availability, such as Internet of Things (IoT), broadcast services, etc. The International Telecommunication Union (ITU) has classified 5G mobile network services into three categories: Enhanced Mobile Broadband (eMBB), Ultra-reliable and Low-latency Communications (uRLLC), and Massive Machine Type Communications (mMTC). eMBB focuses on services that have high bandwidth requirements, such as High Definition (HD) videos, Virtual Reality (VR), and Augmented Reality (AR). uRLLC focuses on latency-sensitive services, such as automated driving and remote management. mMTC focuses on services that include high requirements for connection density, such as smart city and smart agriculture.

In comparison to 4G networks, next generation networks are enhanced in terms of radio access and network architecture. Next generation networks intend to utilize new regions of the radio spectrum for Radio Access Networks (RANs), such as centimeter and millimeter wave bands. Also, the architecture of next generation networks has the functional elements of the user plane separated from the control plane. The user plane carries user traffic, and the control plane carries signaling in the network. With Software-Defined Networking (SDN) and Network Functions Virtualization (NFV) supporting an underlying physical architecture, the functional elements of next generation networks are referred to as network functions. A network function may be implemented either as a network element on dedicated hardware, as a software instance running on dedicated hardware, or as a virtualized function instantiated on an appropriate platform, such as a cloud infrastructure. A network function may be implemented in the user plane or the control plane. One network function in the user plane is a User Plane Function (UPF), and network functions in the control plane include an Access and Mobility Function (AMF), a Session Management Function (SMF), and a Policy Control Function (PCF). Separating the user plane and the control plane allows the resources for each plane to be scaled independently.

Although a basic framework for next generation networks has been suggested, charging standards have yet to be defined.

SUMMARY

Embodiments described herein provide mechanisms for online charging in next generation networks. Credit quota management for online charging is centralized in the SMF of the control plane. The SMF implements a Charging Trigger Function (CTF) that directly interacts with an Online Charging System (OCS). For a session in a next generation network, the CTF at the SMF requests a quota of service units (e.g., monetary units) from the OCS. The CTF at the SMF then manages the quota by distributing slices of the quota to the UPFs that serve the session. Because quota management is performed at the SMF, the UPFs do not need to implement their own independent CTFs to interact with the OCS, which simplifies the charging architecture for next generation networks.

One embodiment comprises an SMF element implemented in a control plane of a next generation network. The SMF element includes a first interface component configured to directly communicate with an OCS, and a second interface component configured to directly communicate with a plurality of UPF elements implemented in a user plane of the next generation network. The UPF elements are provisioned by the SMF element to serve a session requested by User Equipment (UE). The SMF element further includes a controller that implements a CTF configured to transmit a charging request to the OCS through the first interface component requesting a quota of service units for the SMF element, and to receive a charging response from the OCS through the first interface component indicating the quota of service units granted to the SMF element by the OCS. The CTF is configured to manage the quota by allocating slices of the quota to the UPF elements, and to transmit messages to the UPF elements through the second interface component indicating the slices allocated to the UPF elements.

In another embodiment, the SMF element further comprises a third interface component configured to directly communicate with a Policy Control Function (PCF) element implemented in the control plane of the next generation network. The CTF is configured to transmit a policy request to the PCF element through the third interface component requesting policy rules for the session involving the UE, to receive a policy response from the PCF element through the third interface component indicating the policy rules for the session, and to allocate the slices of the quota to the UPF elements based on the policy rules.

In another embodiment, the CTF is configured to allocate the slices of the quota to the UPF elements based on the policy rules and a history of quota consumption by each of the UPF elements.

In another embodiment, the CTF is configured to detect a change to the plurality of UPF elements provisioned for the session, to transmit a return request through the second interface component to the UPF elements requesting return of unused service units of the slices, to add the unused service units to remaining service units of the quota, to manage the quota by allocating new slices of the remaining service units of the quota to the UPF elements, and to transmit the messages to the UPF elements through the second interface component indicating the new slices allocated to the UPF elements.

In another embodiment, the CTF is configured to reserve a share of the quota granted by the OCS, and to add the share reserved from the quota to the remaining service units of the quota.

In another embodiment, the CTF is configured to identify a change to a service during the session, to transmit a return request through the second interface component to the UPF elements requesting return of unused service units of the slices, to add the unused service units to remaining service units of the quota, to manage the quota by allocating new slices of the remaining service units of the quota to the UPF elements based on the change to the service, and to transmit the messages to the UPF elements through the second interface component indicating the new slices allocated to the UPF elements.

In another embodiment, the CTF is configured to receive an update request from a UPF element of the plurality of UPF elements through the second interface component requesting a new slice, to allocate the new slice of remaining service units of the quota to the UPF element, and to transmit a return response to the UPF element through the second interface component indicating the new slice allocated to the UPF element.

In another embodiment, the CTF is configured to determine that the quota is consumed during the session, to transmit another charging request to the OCS through the first interface component requesting a new quota of service units for the SMF element, and to receive another charging response from the OCS through the first interface component indicating the new quota of service units granted to the SMF element by the OCS.

Another embodiment comprises a method operable in an SMF element. The method includes transmitting a charging request from the SMF element to an OCS requesting a quota of service units for the SMF element, and receiving a charging response at the SMF element from the OCS indicating the quota of service units granted to the SMF element by the OCS. The method further includes managing the quota at the SMF element by allocating slices of the quota to a plurality of UPF elements that are provisioned by the SMF element for a session requested by a UE. The method further comprises transmitting messages from the SMF element to the UPF elements indicating the slices allocated to the UPF elements.

In another embodiment, the method further comprises transmitting a policy request from the SMF element to a PCF element requesting policy rules for the session involving the UE, and receiving a policy response at the SMF element from the PCF element indicating the policy rules for the session. The step of allocating the slices of the quota to the UPF elements comprises allocating the slices of the quota to the UPF elements based on the policy rules.

In another embodiment, the step of allocating the slices of the quota to the UPF elements comprises allocating the slices of the quota to the UPF elements based on the policy rules and a history of quota consumption by each of the UPF elements.

In another embodiment, the method further comprises detecting a change to the plurality of UPF elements provisioned for the session, transmitting a return request from the SMF element to the UPF elements requesting return of unused service units of the slices, adding the unused service units to remaining service units of the quota, managing the quota at the SMF element by allocating new slices of the remaining service units of the quota to the UPF elements, and transmitting the messages from the SMF element to the UPF elements indicating the new slices allocated to the UPF elements.

In another embodiment, the method further comprises reserving a share of the quota granted by the OCS, and adding the share reserved from the quota to the remaining service units of the quota.

In another embodiment, the method further comprises identifying a change to a service during the session, transmitting a return request to the UPF elements requesting return of unused service units of the slices, adding the unused service units to remaining service units of the quota, managing the quota by allocating new slices of the remaining service units of the quota to the UPF elements based on the change to the service, and transmitting the messages to the UPF elements indicating the new slices allocated to the UPF elements.

In another embodiment, the method further comprises receiving an update request at the SMF element from a UPF element of the plurality of UPF elements requesting a new slice, allocating the new slice of remaining service units of the quota to the UPF element, and transmitting a return response to the UPF element indicating the new slice allocated to the UPF element.

In another embodiment, the method further comprises determining that the quota is consumed during the session, transmitting another charging request to the OCS requesting a new quota of service units for the SMF element, and receiving another charging response from the OCS indicating the new quota of service units granted to the SMF element by the OCS.

Another embodiment comprises a non-transitory computer readable medium embodying programmed instructions executed by one or more processors, wherein the instructions direct the processors to implement an SMF in a control plane of a next generation network. The SMF is configured to directly communicate with an OCS, and is configured to directly communicate with a plurality of UPF elements in a user plane of the next generation network. The UPF elements are provisioned by the SMF to serve a session requested by a UE. The SMF includes a CTF configured to transmit a charging request to the OCS requesting a quota of service units for the SMF, and to receive a charging response from the OCS indicating the quota of service units granted to the SMF by the OCS. The CTF is configured to manage the quota by allocating slices of the quota to the UPF elements, and to transmit messages to the UPF elements indicating the slices allocated to the UPF elements.

Another embodiment comprises an SMF element implemented in a control plane of a next generation network. The SMF element includes a means for directly communicating with an OCS, and a means for directly communicating with a plurality of UPF elements implemented in a user plane of the next generation network. The SMF element further includes a means for implementing a CTF configured to transmit a charging request to the OCS requesting a quota of service units for the SMF element, and to receive a charging response from the OCS indicating the quota of service units granted to the SMF element by the OCS. The CTF is configured to manage the quota by allocating slices of the quota to the UPF elements, and to transmit messages to the UPF elements indicating the slices allocated to the UPF elements.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
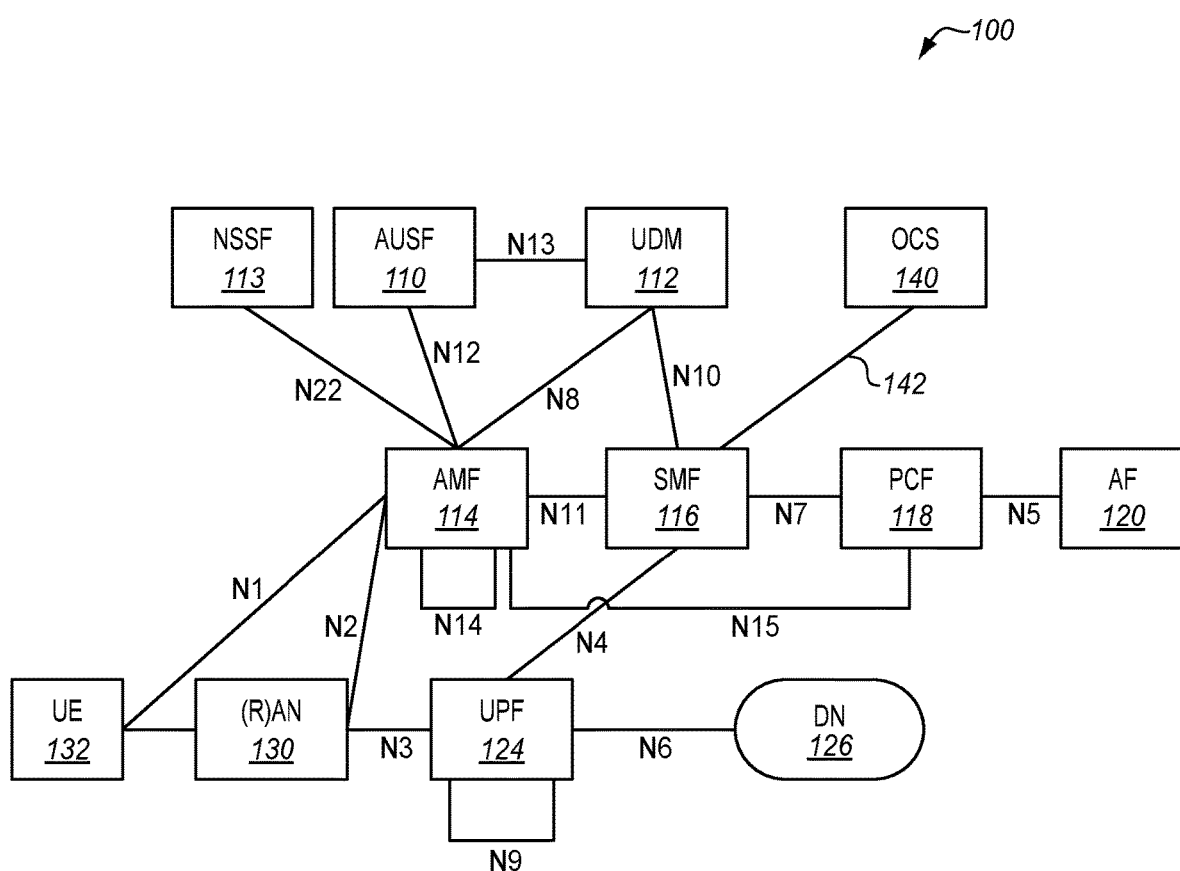
FIG. 1 illustrates a non-roaming architecture of a next generation network in an illustrative embodiment.

FIG. 1 illustrates a non-roaming architecture 100 of a next generation network in an illustrative embodiment. The architecture in FIG. 1 is a reference point representation, as is further described in 3GPP TS 23.501 (v1.5.0), which is incorporated by reference as if fully included herein. The control plane of architecture 100 includes Authentication Server Function (AUSF) 110, a Unified Data Management (UDM) 112, a Network Slice Selection Function (NSSF) 113, an Access and Mobility Management Function (AMF) 114, a Session Management Function (SMF) 116, a Policy Control Function (PCF) 118, and an Application Function (AF) 120. The user plane of architecture 100 includes one or more User Plane Functions (UPF) 124 that communicate with a Data Network (DN) 126. A (Radio) Access Network ((R)AN) 130 and User Equipment (UE) 132 are able to access the control plane and the user plane of the core network. (R)AN 130 is a type of communication network where the last link to end user devices (e.g., UE) is wireless.

AUSF 110 is configured to support authentication of UE 132. UDM 112 is configured to store subscription data/information for UE 132. UDM 112 may store three types of user data: subscription, policy, and session-related context (e.g., UE location). AMF 114 is configured to provide UE-based authentication, authorization, mobility management, etc. SMF 116 is configured to provide the following functionality: session management (SM), UE Internet Protocol (IP) address allocation and management, selection and control of UPF 124, termination of interfaces towards PCF 118, control part of policy enforcement and Quality of Service (QoS), lawful intercept, termination of SM parts of NAS messages, Downlink Data Notification (DNN), roaming functionality, handle local enforcement to apply QoS for Service Level Agreements (SLAs), charging data collection and charging interface, etc. If UE 132 has multiple sessions, different SMFs may be allocated to each session to manage them individually and possibly provide different functionalities per session. PCF 118 is configured to support a unified policy framework to govern network behavior, and to provide policy rules to control plane functions for QoS enforcement, charging, access control, traffic routing, etc. AF 120 provides information on a packet flow to PCF 118. Based on the information, PCF 118 is configured to determine policy rules about mobility and session management to make AMF 114 and SMF 116 operate properly.

UPF 124 supports various user plane operations and functionalities as part of a service, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. DN 126 is not part of the core network, and provides Internet access, operator services, 3rd party services, etc.

Architecture 100 includes the following reference points. The N1 reference point is implemented between UE 132 and AMF 114. The N2 reference point is implemented between (R)AN 130 and AMF 114. The N3 reference point is implemented between (R)AN 130 and UPF 124. The N4 reference point is implemented between the SMF 116 and UPF 124. The N5 reference point is implemented between PCF 118 and AF 120. The N6 reference point is implemented between UPF 124 and DN 126. The N7 reference point is implemented between the SMF 116 and PCF 118. The N8 reference point is implemented between UDM 112 and AMF 114. The N9 reference point is implemented between two UPFs 124. The N10 reference point is implemented between UDM 112 and SMF 116. The N11 reference point is implemented between AMF 114 and SMF 116. The N12 reference point is implemented between AMF 114 and AUSF 110. The N13 reference point is implemented between UDM 112 and AUSF 110. The N14 reference point is implemented between two AMFs. The N15 reference point is implemented between PCF 118 and AMF 114 in the case of a non-roaming scenario. The N22 reference point is implemented between NSSF 113 and AMF 114.

AMF 114, SMF 116, PCF 118, UPF 124, etc., of architecture 100 are referred to herein as "elements" or "network elements". An "element" includes functions, operations, etc., and the underlying hardware or physical devices (e.g., processors) that are programmed to perform the functions. The elements are part of a system within the next generation network that provide connectivity and other functions for a session.

Architecture 100 also includes an Online Charging System (OCS) 140 that is communicatively coupled to SMF element 116 via a reference point 142. OCS 140 comprises a server, device, apparatus, or equipment (including hardware) that provides online charging for services provided in a next generation network, such as a 5G network. Online charging is a charging mechanism where charging information can affect, in real-time, the service rendered and therefore a direct interaction of the charging mechanism with session/service control is required. Online charging can be of two types: session-based or event-based. In event-based charging, a charging event is reported for a single operation. In session-based charging, multiple charging events are reported for a session. A further discussion of charging principles is described in 3GPP TS 32.240 (v15.0.0), which is incorporated by reference as if fully included herein. Although the charging domain is referred to herein as an OCS, it may be a combined online and offline charging system.

In this embodiment, SMF element 116 is enhanced to manage a quota of service units for UPF elements 124 that serve a session of UE 132. As an overview, SMF element 116 interacts with OCS 140 to obtain a quota of service units, and then manages the quota by distributing slices of the quota to the UPF elements 124 provisioned for the session. Thus, the UPF elements 124 do not interact directly with OCS 140 to obtain their own quota. SMF element 116 interacts with OCS 140 in place of UPF elements 124 to obtain a quota for a session, and then distributes the quota based on policy rules, access type, service type, QoS, etc.

Figure 2:
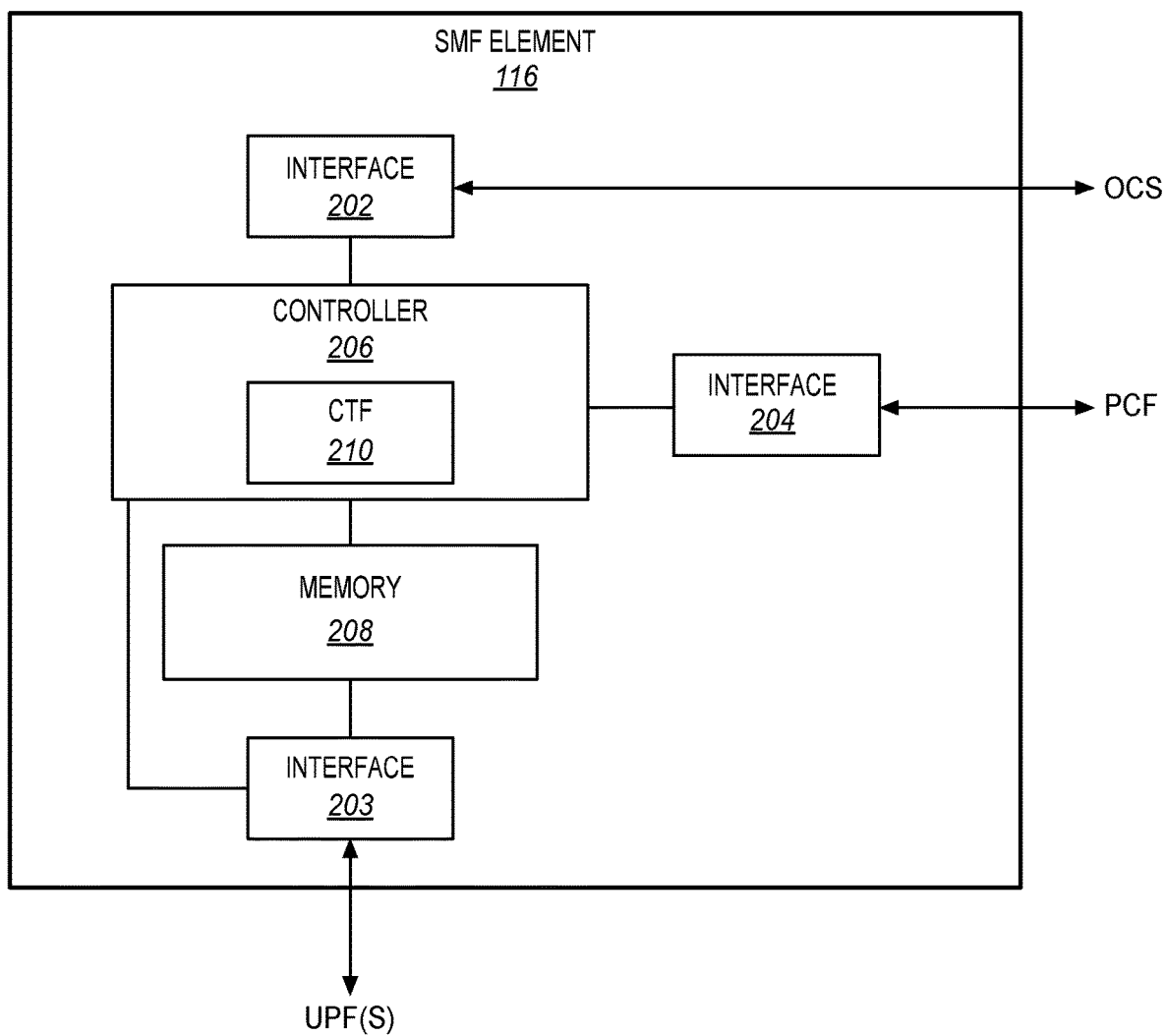
FIG. 2 is a block diagram of an SMF element in an illustrative embodiment.

FIG. 2 is a block diagram of SMF element 116 in an illustrative embodiment. SMF element 116 is an element or apparatus in the control plane of a next generation network that is configured to perform session management for sessions (e.g., Packet Data Unit (PDU) sessions) involving UEs. SMF element 116 includes an interface component 202 configured to directly communicate with OCS 140, an interface component 203 configured to directly communicate with UPF elements 124, and an interface component 204 configured to directly communicate with PCF element 118. Interface components 202-204 may comprise circuitry, logic, hardware, means, etc., that interact with other elements via messages, signals, etc. Interface component 202 may communicate with OCS 140 via a CH reference point that is Diameter-based (e.g., Gy or Gz) or based on another protocol such as HTTP/2. Interface component 202 may communicate with OCS 140 via another reference point that is or may be defined for online charging. Interface component 203 may communicate with UPF elements 124 via the N4 reference point (e.g., Sx). Interface component 204 may communicate with PCF element 118 via the N7 reference point that is Diameter-based (e.g., Gx) or is based on another protocol.

SMF element 116 further includes a controller 206 and a memory 208. Controller 206 represents a component that provides the functions of an SMF element in a next generation network through one or more processors or other physical resources, such as internal circuitry, logic, hardware, means, etc., that provides the functions of an SMF. For instance, controller 206 is configured to dynamically provision UPF elements 124 for a session. Memory 208 is a computer readable storage medium (e.g., ROM or flash memory) means for storing data, instructions, applications, etc., and is accessible by controller 206. SMF element 116 may include various other components not specifically illustrated in FIG. 2.

Controller 206 implements a Charging Trigger Function (CTF) 210 in this embodiment. CTF 210 the focal point for collecting information pertaining to chargeable events, assembling the information into matching charging events, and sending the charging events towards OCS 140. The charging events are forwarded to OCS 140 in order to obtain authorization for the chargeable event/network resource usage. CTF 210 is configured to delay the actual resource usage until permission by OCS 140 has been granted, to track the availability of resource usage permission (i.e., quota management) during the network resource usage, and enforce termination of network resource usage when permission by OCS 140 is not granted or expires. In this embodiment, CTF 210 is configured to manage a quota for a session on behalf of the UPF elements 124 provisioned for the session. A further description of quota management is described below.

Figure 3:
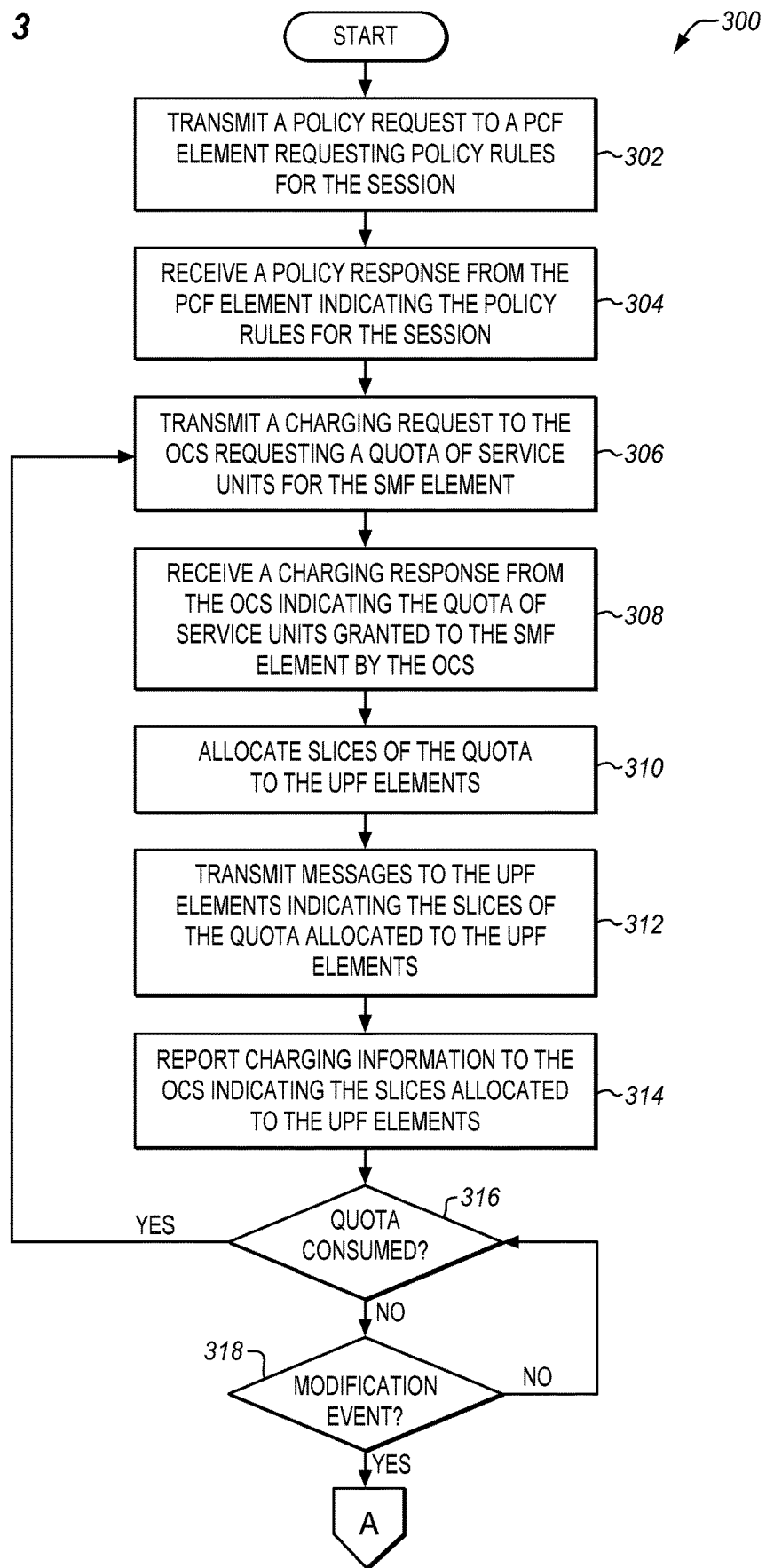
FIG. 3 is a flow chart illustrating a method of performing quota management in an illustrative embodiment.
Figure 4:
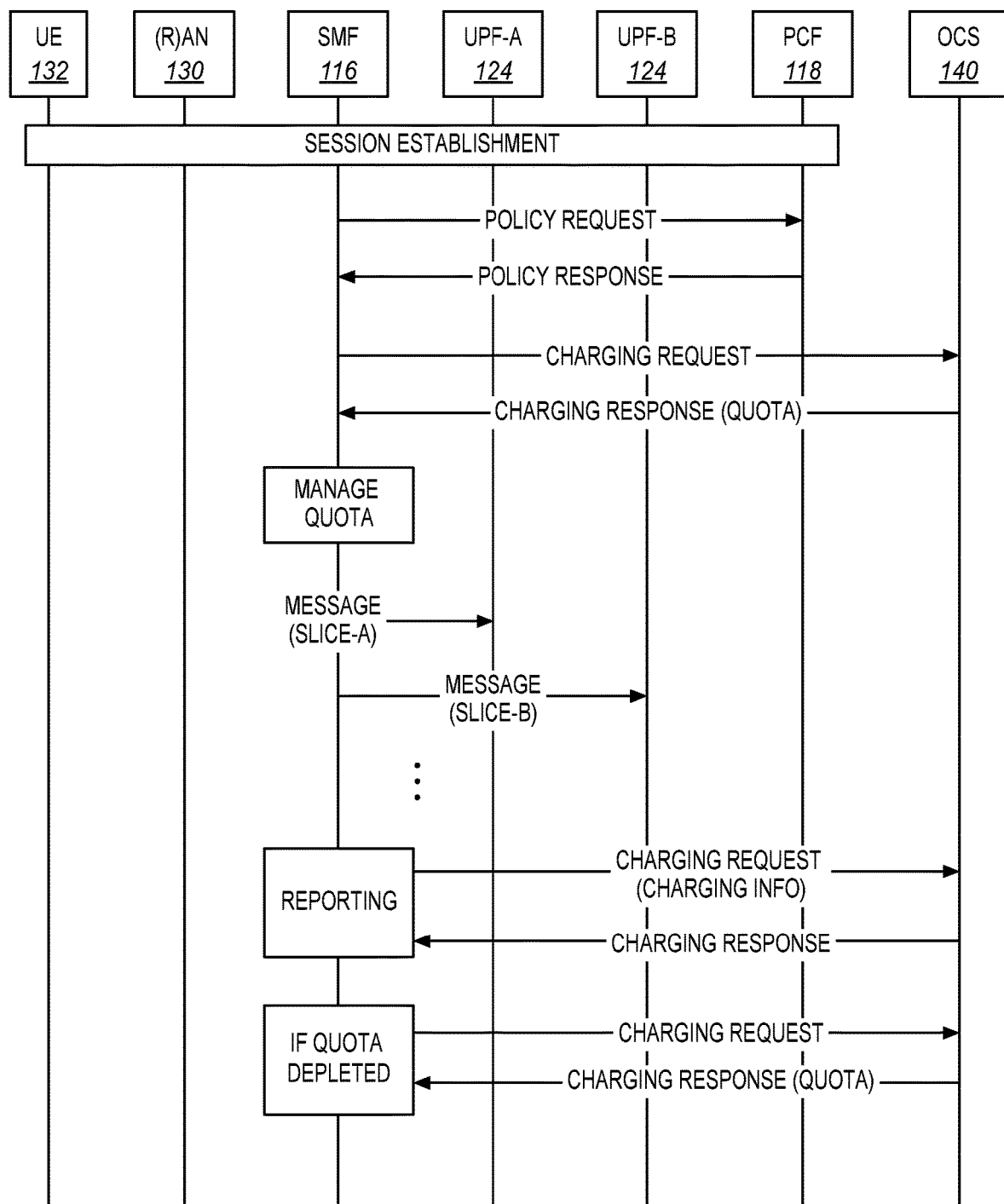
FIG. 4 is a message diagram for quota management in an illustrative embodiment.

FIG. 3 is a flow chart illustrating a method 300 of performing quota management in an illustrative embodiment. The steps of method 300 will be described with reference to architecture 100 in FIG. 1 and SMF element 116 in FIG. 2, but those skilled in the art will appreciate that method 300 may be performed in other devices/architectures. The steps of the flow charts described herein are not all inclusive and may include other steps not shown, and the steps may be performed in an alternative order. FIG. 4 is a message diagram for quota management in an illustrative embodiment. The message diagram in FIG. 4 indicates the messaging that may occur between elements, such as for method 300.

One assumption for method 300 is that a session (e.g., a PDU session) is being established or has been established for UE 132. For the session, SMF element 116 provisions multiple UPF elements 124 to serve the session (indicated as UPF-A and UPF-B in FIG. 4). For example, at session establishment, SMF element 116 may select and provision a set of UPF elements 124. In this embodiment, UPF elements 124 do not implement their own independent CTF in order to perform online charging. Instead, CTF 210 of SMF element 116 operates on behalf of UPF elements 124 to perform online charging, and acts as a single CTF for the session. In other words, CTF 210 in SMF element 116 is the sole CTF interacting with OCS 140 for a single session.

To provide quota management, CTF 210/SMF element 116 may acquire policy rules for UE 132 from PCF element 118, such as in response to session establishment. CTF 210 may therefore transmit a policy request to PCF element 118 (through interface component 204) requesting policy rules (e.g., Policy and Charging Control (PCC) rules) for the session involving UE 132 (step 302). CTF 210 may include a variety of information regarding the session in the policy request sent to PCF element 118, such as information regarding PCF element 118, information regarding UPF elements 124 provisioned for the session, QoS information, service information, etc.

In response to the policy request, PCF element 118 may make a policy decision for the session involving UE 132, and generate or formulate the policy rules. The policy rules govern how CTF 210 manages a quota for the session. CTF 210 may then receive a policy response from PCF element 118 indicating the policy rules for UE 132 (step 304). CTF 210 stores the policy rules in a local memory, such as memory 208.

The policy rules for SMF-centric credit pooling may include but are not limited to: allowing one or multiple UPF elements in a session, allowing one quota lump sum or distributed quotas per UPF element, defining the criteria for quota distribution (such as Service Data Flow (SDF), QoS, time window, maximum packets, etc.) if a quota is granted per UPF element, UPF handover criteria including UPF types, service types, etc., SMF quota reservation and limitation in credit pooling, SMF interim reporting mechanism (to either the PCF element or OCS), offline charging diversion if credit quota is consumed during online charging, charging spending limit policies respectively for online and offline charging, and network slicing mode and policy.

In order to manage a quota for the session, CTF 210 first acquires the quota from OCS 140. Thus, CTF 210 transmits a charging request to OCS 140 (through interface component 202) requesting a quota of service units for SMF element 116 (step 306). CTF 210 requests a single credit quota from OCS 140 for the session, and the quota is therefore referred to as a quota for SMF element 116. In response to the charging request, OCS 140 identifies a subscriber profile for the end user of UE 132. The subscriber profile (also referred to as a charging profile) indicates a service plan that the end user has subscribed to, indicates a class of service for the end user, and other relevant charging information. OCS 140 also identifies an account balance for the end user. The account balance is typically maintained in an Account Balance Management Function (ABMF) in OCS 140. The account balance represents the amount of money or other service units that the end user has purchased in advance. When the account balance of the end user is sufficient, OCS 140 may grant a quota or allotment of service units from the account balance of the end user for the session. The quota comprises any portion of the account balance that OCS 140 grants to SMF element 116 for credit control. For example, if the end user has a balance of 200 service units, then OCS 140 may allocate 50 service units for the session to SMF element 116. If OCS 140 does not grant a quota, then CTF 210 will receive a charging response from the OCS 140 (through interface component 202) indicating that the session is not allowed (i.e., including a cause code). CTF 210 will therefore terminate the session or block session establishment.

If OCS 140 grants a quota, then CTF 210 will receive a charging response from OCS 140 indicating the quota of service units granted to SMF element 116 by the OCS 140 (step 308). CTF 210 centrally manages the quota among multiple UPF elements 124 involved in the session by evaluating credit needs among UPF elements 124, and distributing the quota among UPF elements 124 in the form of slices. CTF 210 may distribute the entirety of the quota to UPF elements 124, or may reserve a share of the quota granted by OCS 140. CTF 210 may re-distribute the reserved share in the middle of the session as needed.

To manage the quota, CTF 210 allocates a slice of the quota to each of the UPF elements 124 provisioned for the session (step 310), assuming that the quota balance is sufficient. CTF 210 may receive a message from UPF elements 124 requesting authorization to perform a function or otherwise serve the session, which triggers CTF 210 to allocate the slices to the UPF elements 124. CTF 210 may evaluate the credit needs for each UPF element 124 based on the policy rules received from PCF element 118, service type, SDF, QoS, expected packets and time, etc., and allocate the slices accordingly. CTF 210 may also allocate slices based on history of quota consumption by a UPF element 124. A network operator may set up a history rules/experience in SMF element 116 to assist with this evaluation and estimation. Initially, slice allocation may be based on heuristics (e.g., different UPF elements 124 may have different "rates of spending" as predicated by the QoS provided within those UPF elements, thereby influencing the quota distribution strategy at SMF element 116). Over time, slice allocation may be gradually refined via a feedback loop at SMF element 116.

CTF 210 transmits messages to UPF elements 124 (through interface component 203) indicating the slices of the quota granted to UPF elements 124 (step 312). In other words, CTF 210 sends a message to each UPF element 124 provisioned for the session indicating the slice for that element. The message may indicate the slice for that UPF element 124 only. A UPF element 124 interprets receipt of a slice from SMF element 116 as authorization to serve the session and perform budget control to decrement from the slice according to resource usage. CTF 210 also manages the quota by decrementing the slices granted to UPF elements 124 from the quota so that a running balance of the quota is monitored.

As shown in FIG. 4, CTF 210 in SMF element 116 may transmit a message to the UPF-A indicating slice-A of the quota that is allocated to UPF-A 124. CTF 210 in SMF element 116 may transmit a message to the UPF-B indicating slice-B of the quota that is allocated to UPF-B 124. Similar messaging may occur for a number of UPF elements 124 until a modification event is detected (step 318 in FIG. 3). For example, the modification event may be the end of the session, the quota becomes depleted, the session is modified, UPF elements 124 are added or dropped from the session or hand over from one UPF element to another (e.g., mobility), UPF elements 124 use up their slice, etc. When encountering a modification event, SMF element 116 is configured to intelligently re-evaluate credit needs among UPF elements 124, rebalance the remaining quota, and redistribute the remaining quota to the remaining UPF elements 124 with or without reporting to PCF element 118 and/or OCS 140.

CTF 210 may also report charging information to the OCS 140 indicating the slices allocated to the UPF elements 124 (step 314). For example, CTF 210 may transmit a charging request to OCS 140 indicating the slice allocated to each of the UPF elements 124.

As is evident in the above embodiment, SMF element 116 manages a quota on behalf of UPF elements 124. One technical benefit is that UPF elements 124 do not need to implement their own independent CTFs to interact with OCS 140. Another technical benefit is that OCS 140 only has to interact with SMF element 116 during a session, and is not bombarded with messages from multiple UPF elements 124 during the session.

As CTF 210 grants slices to UPF elements 124 and monitors the volume or balance of the quota, CTF 210 may determine that the quota is consumed during the session (step 316). In response to determining that the quota is consumed, CTF 210 may transmit another charging request to OCS 140 requesting a new quota of service units for SMF element 116 (step 306), and receive another charging response from OCS 140 indicating the new quota of service units granted to SMF element 116 by OCS 140 (step 308). This may happen when quota redistribution or rebalancing may not suffice to provide sufficient coverage for a session. In another embodiment, CTF 210 may end the session or may allow for over-charging with an online threshold level. Over-charging thresholds may be set at different levels. UPF element 124 and the end user may be notified for over-charging (e.g., SMS or other form of communication to the end user). The end user may choose to reject over-charging, in which CTF 210 will terminate the session. If the end user indicates a separate charging account to continue the session, CTF 210 will end the current charging session and start a new charging session to the new charging account. In another embodiment, PCF element 118 and OCS 140 may direct CTF 210 to switch from online charging mode to offline charging mode when the quota is consumed.

Figure 5:
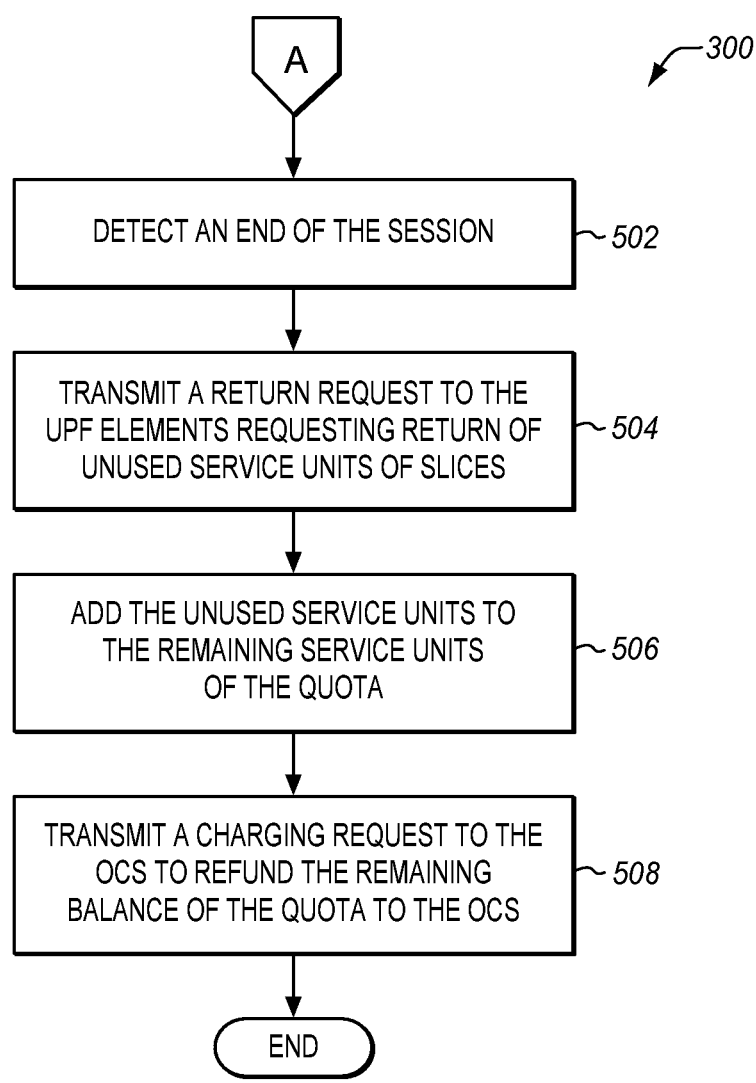
FIG. 5 is a flow chart illustrating additional steps of the method of FIG. 3 responsive to an end of the session in an illustrative embodiment.

The slices allocated above are used for online charging until a modification event is detected by CTF 210 (step 318). In one embodiment, a modification event may be an end to the session. FIG. 5 is a flow chart illustrating additional steps of method 300 responsive to an end of the session in an illustrative embodiment. CTF 210 detects an end of the session (step 502). For example, CTF 210 may receive a message from a UPF element 124 or another element indicating that the session has ended. CTF 210 transmits a return request to the UPF elements 124 (which were previously allocated slices of the quota) requesting return of unused service units of the slices (step 504). CTF 210 adds the unused service units to the remaining service units or remaining balance of the quota (step 506). CTF 210 then transmits a charging request to OCS 140 to refund the remaining balance of the quota to OCS 140 (step 508).

Figure 6:
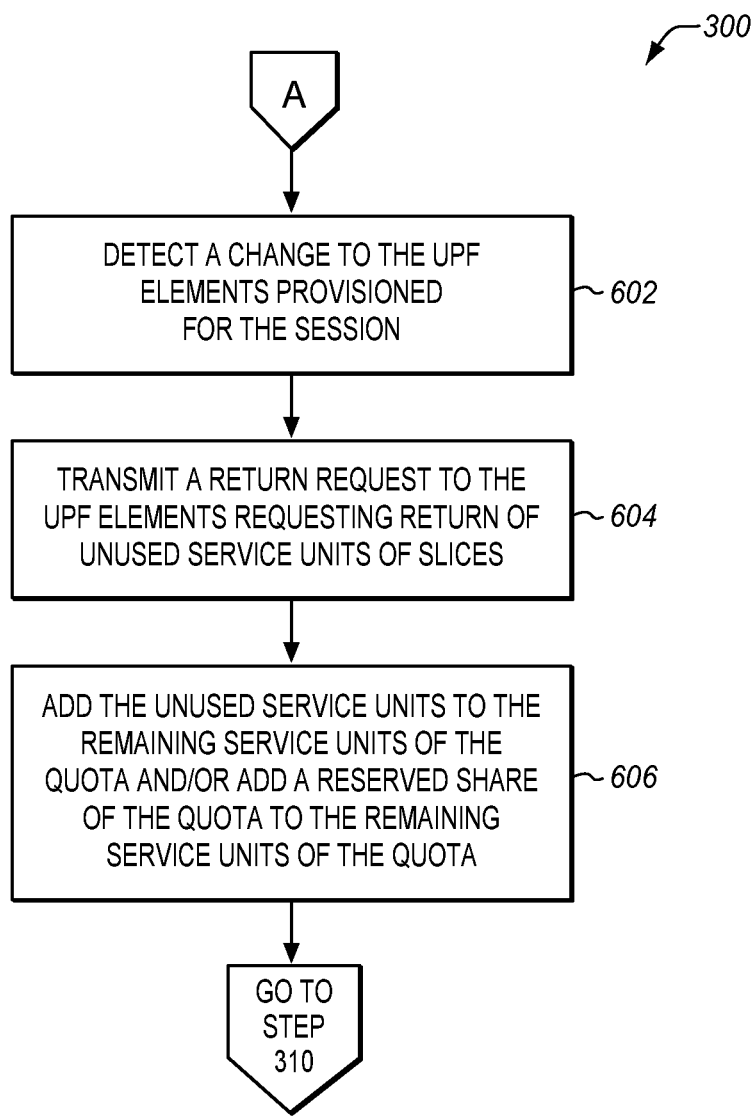
FIG. 6 is a flow chart illustrating additional steps of the method of FIG. 3 responsive to a change to UPF elements in an illustrative embodiment.

Other modification events may occur during a session, and CTF 210 may respond to such modification events by redistributing the quota (or remaining portion thereof) to the UPF elements 124 serving the session. In redistributing the quota, CTF 210 may request that each UPF element 124 returns unused portions of previously-allocated slices, and reallocate the remaining balance of the quota to the UPF elements 124 based on present conditions. For instance, a modification event may be a change to the UPF elements 124 provisioned for the session. FIG. 6 is a flow chart illustrating additional steps of method 300 responsive to a change to the UPF elements 124 in an illustrative embodiment. CTF 210 detects a change to the UPF elements 124 provisioned for the session (step 602). A change to the UPF elements 124 may comprise addition of a UPF element 124 during the session, removal of a UPF element 124 during the session, handover from one UPF element 124 to another during the session, etc. For example, due to the mobility of UE 132, UPF elements 124 may change during a session. A set of UPF elements 124 may be initially provisioned for the session by SMF element 116 when the session is established, and CTF 210 may grant slices to each UPF element 124 in the set. If a UPF element 124 is added or removed from the set, then CTF 210 is able to detect the change. CTF 210 transmits a return request to the UPF elements 124 (which were previously allocated slices of the quota) requesting return of unused service units of the slices (step 604). CTF 210 adds the unused service units to the remaining service units or remaining balance of the quota (step 606). If CTF 210 previously reserved a share of the quota granted by OCS 140, then it may also add the reserved share to the remaining balance of the quota. CTF 210 then redistributes the remaining balance of the quota to UPF elements 124, as indicated by returning to step 310 in FIG. 3.

Figure 7:
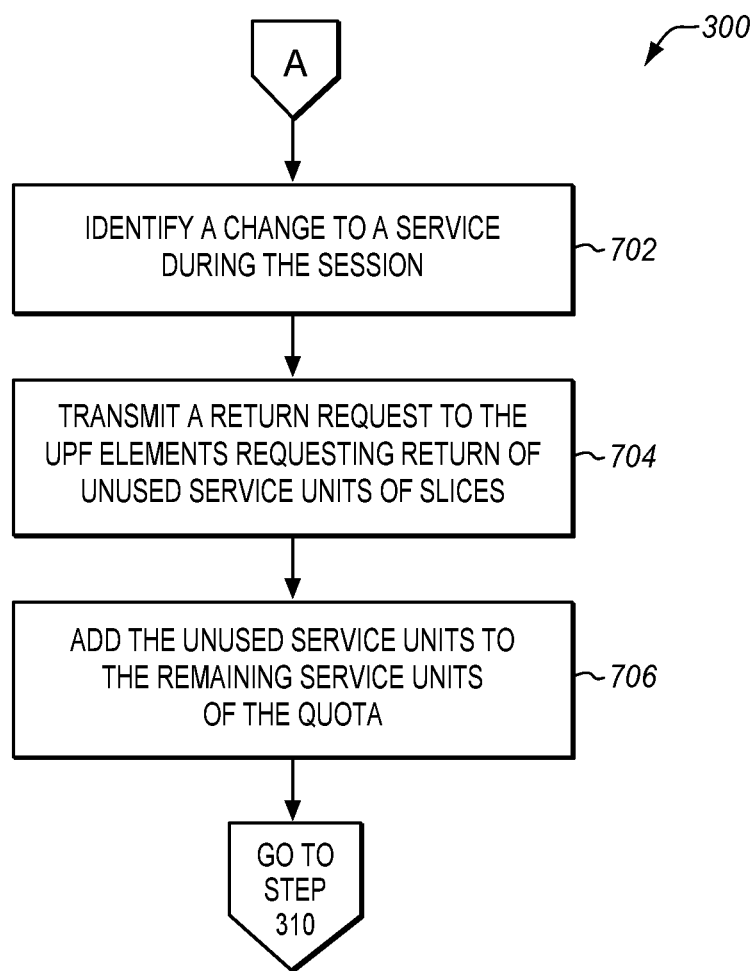
FIG. 7 is a flow chart illustrating additional steps of the method of FIG. 3 responsive to a change to a service in an illustrative embodiment.

In another embodiment, a modification event may be a change to one or more services during the session. FIG. 7 is a flow chart illustrating additional steps of method 300 responsive to a change to a service in an illustrative embodiment. CTF 210 identifies the change to a service during the session (step 702). For example, CTF 210 may receive an update message from a UPF element 124 indicating a change to a service description, access type, QoS, etc., during a session. CTF 210 transmits a return request to the UPF elements 124 requesting return of unused service units of the slices (step 704). CTF 210 adds the unused service units of the slice to the remaining service units in the quota (step 706). If CTF 210 previously reserved a share of the quota granted by OCS 140, then it may also add the reserved share to the remaining balance of the quota. CTF 210 then redistributes the remaining balance of the quota to UPF elements 124 based on the change to the service, as indicated by returning to step 310 in FIG. 3. In redistributing the quota, CTF 210 may acquire new policy rules for UE 132 from PCF element 118. CTF 210 may therefore transmit a policy request to PCF element 118 (through interface component 204) requesting policy rules for the session involving UE 132 in light of the service change. CTF 210 is able to modify quota consumption without requesting a new quota from OCS 140. When a service changes in this manner, CTF 210 may request that each UPF element 124 return a remaining portion of their slice, and redistribute the remaining balance of the quota to UPF elements 124.

Figure 8:
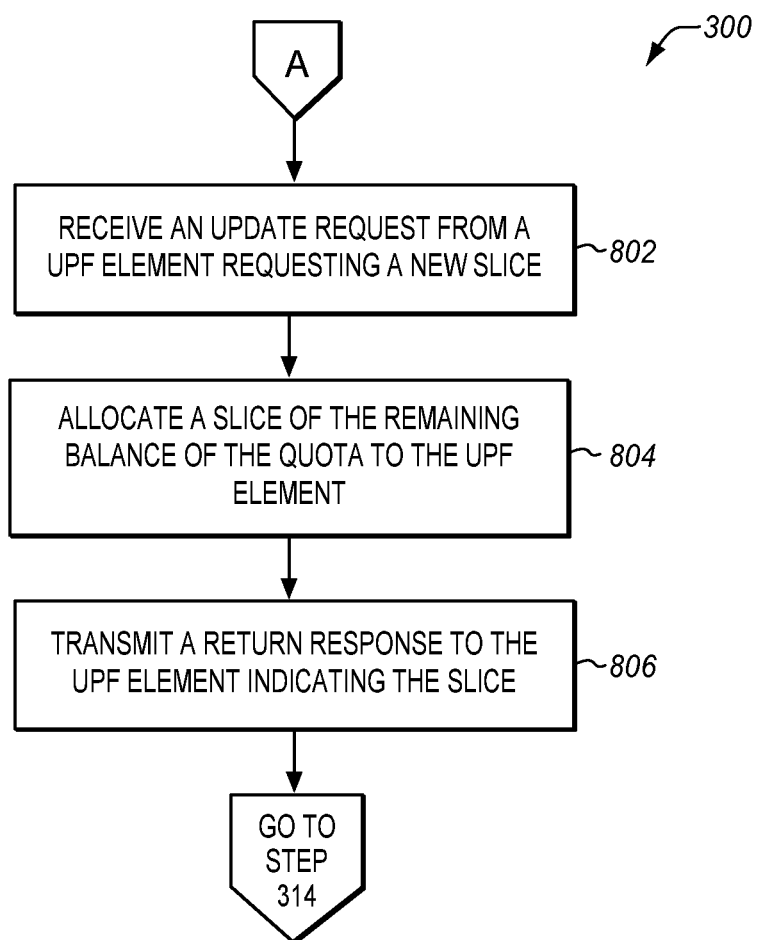
FIG. 8 is a flow chart illustrating additional steps of the method of FIG. 3 responsive to a request for a new slice by a UPF element in an illustrative embodiment.

In another embodiment, a modification event may be a request for a new slice by a UPF element 124. FIG. 8 is a flow chart illustrating additional steps of method 300 responsive to a request for a new slice by a UPF element 124 in an illustrative embodiment. CTF 210 receives an update request from a UPF element 124 requesting a new slice (step 802). A UPF element 124 performs budget control by decrementing a balance of the slice in accordance with resource usage. When or before its slice is depleted, the UPF element 124 may send an update request to CTF 210 requesting a new slice. In response to the update request, CTF 210 allocates another slice of the quota (i.e., from the remaining service units) to the UPF element 124 (step 804). CTF 210 then transmits a return response to the UPF element 124 indicating the new slice (step 806). Method 300 then returns to step 314 in FIG. 3. When a UPF element 124 requests a new slice, CTF 210 may request that each UPF element 124 return a remaining portion of their slice, and redistribute the remaining balance of the quota to the UPF elements 124 instead of just allocating another slice to the UPF element 124 that requested the new slice.

UPF elements 124 may periodically send update messages to SMF element 116 indicating resource usage, slice information, etc. CTF 210 may report charging information to OCS 140 in response to receiving the update messages from UPF elements 124. PCF element 118 may instruct CTF 210, via the policy rules, whether and when to send interim reports to OCS 140 with the charging information.

There may be a scenario where OCS 140 grants a quota per UPF 124 instead of granting a single quota to SCF element 116. In such a scenario, SMF element 116 may pass a granted quota to a UPF element 124 with or without modification. SMF element 116 may process the policy rules from PCF element 118 or locally-provisioned rules at SMF element 116 to determine whether or not to modify a quota granted to a UPF element 124 by OCS 140.

In another embodiment, the reference point 142 between SMF element 116 and OCS 140 may comprise a CH reference point that is based on Diameter protocol (e.g., Gy or Gz), such as described in 3GPP TS 32.299 (v15.1.0), which is incorporated by reference as if fully included herein. The CH reference point is enhanced in this embodiment to support quota management in SMF element 116. The CH reference point uses Credit Control Request (CCR) and Credit Control Answer (CCA) messages. Data delivered by Diameter protocol is in the form of Attribute Value Pairs (AVP). Some of the AVP values are used by Diameter protocol itself, while other AVPs deliver data associated with particular applications that employ Diameter. In order to support quota management, the CH reference point may be extended so that the Diameter request sent from SMF element 116 to OCS 140 includes one or more new AVPs. The following illustrates a CCR of the CH reference point with new AVPs.

A CCR (Initial) command from SMF element 116 to OCS 140 may have the following message format:

```
<CCR> ::= < Diameter Header: 272, REQ, PXY >
        < Session-Id >
        { Origin-Host }
        { Origin-Realm }
        { Destination-Realm }
        { Auth-Application-Id }
        { Service-Context-Id }
        { CC-Request-Type }
        { CC-Request-Number }
        [ Destination-Host ]
        [ User-Name ]
        [ Origin-State-Id ]
        [ Event-Timestamp ]
       *[ Subscription-Id ]
        [ Termination-Cause ]
        [ Requested-Action ]
        [ AoC-Request-Type ]
        [ Multiple-Services-Indicator ]
       *[ Multiple-Services-Credit-Control ] ###
        [ CC-Correlation-Id ]
        [ User-Equipment-Info ]
       *[ Proxy-Info ]
       *[ Route-Record ]
        [ Service-Information ] ###
```

A "*" indicates that the AVP may occur multiple times. A "###" indicates an AVP that is extended to support quota management in an SMF element 116. A "+++" indicates a new AVP added to support quota management in an SMF element 116.

The Multiple-Services-Credit-Control AVP may have the following format:

```
<Multiple-Services-Credit-Control> ::= < AVP Header: 456 >
        [ Granted-Service-Unit ]
        [ Requested-Service-Unit ]
       * [ Used-Service-Unit ]
       * [ Service-Identifier ]
        [ online-only ] +++
        [ offline-only ] +++
        [ online-offline ] +++
        [ Rating-Group ]
       * [ G-S-U-Pool-Reference ]
        [ Validity-Time ]
        [ Result-Code ]
        [ Final-Unit-Indication ]
        [ Time-Quota-Threshold ]
        [ Volume-Quota-Threshold ]
        [ Unit-Quota-Threshold ]
        [ Quota-Holding-Time ]
        [ Quota-Consumption-Time ]
       * [ Reporting-Reason ]
        [ Trigger ]
        [ PS-Furnish-Charging-Information ]
        [ Refund-Information ]
       * [ AF-Correlation-Information]
           * [ Envelope ]
             [ Envelope-Reporting ]
             [ Time-Quota-Mechanism ]
       * [ Service-Specific-Info ]
        [ QoS-Information ]
       * [ Announcement-Information ]
        [ 3GPP-RAT-Type ]
        [ Related-Trigger ]
```

The Service-Information AVP may have the following format:

```
Service-Information ::= < AVP Header:873>
       *[ Subscription-Id ]
        [AoC-Information ]
        [ PS-Information ]
        [ IMS-Information ]
        [ MMS-Information ]
        [ LCS-Information ]
        [ PoC-Information ]
        [ MBMS-Information ]
        [ SMS-Information ]
        [ VCS-Information ]
        [ MMTel-Information ]
        [ ProSe-Information ]
        [ Service-Generic-Information ]
        [ IM-Information ]
        [ DCD-Information ]
        [ M2M-Information ]
        [ CPDT-Information ]
        [ SMF-Information ] +++
       *[ UPF-Information ] +++
```

The SMF-Information AVP may include an SMF-ID, SMF credit pooling options, etc. The SMF-Information AVP may have the following format.

```
SMF-Information ::= < AVP Header>
        [ SMF-Id ]
        [ DN-Id ]
        [ SMF-Credit-Pooling Option ]
        [ SMF-Credit-Reservation Option ]
       *[AVP ]
```

The SMF-Id AVP is defined to indicate, deliver, or identify a SMF ID for the SMF element 116 sending the CCR. The DN-Id is optional and is defined to indicate, deliver, or identify a data network ID for 5G forward compatibility reasons. The SMF-Credit-Pooling Option AVP is defined to indicate, deliver, or identify a numeric choice for credit pooling. The SMF-Credit-Reservation Option AVP is defined to indicate or identify whether to reserve a percentage of a quota of service units.

The UPF-Information AVP may have the following format:

```
UPF-Information ::= < AVP Header>
        [ UPF-Id ]
        [ DN-Id ]
           *[ QoS-Information ]
           *[ QoS-Flow-Identifier ]
```

```
            [ UPF-Anchoring-Start-Time ]
            [ UPF-Anchoring-Stop-Time ]
            *[ AVP ]
```

The UPF-Id AVP is defined to indicate, deliver, or identify a UPF ID for a UPF element provisioned for a session. The DN-Id is optional and is defined to indicate, deliver, or identify a data network ID for 5G forward compatibility reasons. The QoS-Information AVP is defined to indicate, deliver, or identify QoS information for enforcement by a UPF element, such as a QoS ID (e.g., 5QI). The QoS-Flow-Identifier is defined to indicate, deliver, or identify a QoS Flow ID, such as a QFI. The UPF-Anchoring-Start-Time AVP is defined to indicate, deliver, or identify a join time of a UPF element for a session, and the UPF-Anchoring-Stop-Time AVP is defined to indicate, deliver, or identify a release time of the UPF element.

A session may span more than one UPF element 124, and the multi-occurrence of UPF elements 124 is accounted for by making UPF-Information a multi-occurrence AVP under the Service-Information grouped AVP in the CCR. Then, within a UPF element 124, there may be several QFIs active, and both QoS-Information and QoS-Flow-Identifier are a multiple-occurrence AVP within the grouped AVP UPF-Information. CTF 210 may populate information for SMF element 116 in the SMF-Information AVP of a CCR. The granted quota from OCS 140 to SMF element 116 will be a lump sum for overall UPF elements 124 for the session if multiple UPF elements 124 are involved in the session, because OCS 140 may not be informed of UPF anchoring changes in a session in advance. In CCR interim and end messages, SMF element 116 may report credit usage information per UPF element 124 using the Service-Information AVP and the newly-added UPF-Information AVP (one UPF-Information occurrence per UPF element 124 in the session). CTF 210 may use the Multiple-Services-Credit-Control AVP to summarize quota usage information optionally either per SMF element 116 or per UPF element 124.

In one embodiment, the N7 reference point between SMF element 116 and PCF element 118 may comprise a Diameter Gx reference point that is enhanced as described herein. The Diameter Gx reference point is used for obtaining policy rules, and is enhanced to support SMF element 116 to centrally handle credit pooling charging rules. A description of a Gx reference point is provided in 3GPP TS 29.212 (v15.1.0), which is incorporated by reference as if fully included herein. One purpose of sending a CCR from SMF element 116 to PCF element 118 is to establish policy rules (e.g., charging rules) at PCF element 118 dynamically. This CCR carries the UPF-Information on a per session basis. Therefore, dynamic triggers are established for threshold reporting on a per session basis at PCF element 118.

A CCR command from SMF element 116 to PCF element 118 may have the following format:

```
<CC-Request> ::= < Diameter Header: 272, REQ, PXY >
                < Session-Id >
                { Auth-Application-Id }
                { Origin-Host }
                { Origin-Realm }
                { Destination-Realm }
                { CC-Request-Type }
                { CC-Request-Number }
                [ Destination-Host ]
                [ Origin-State-Id ]
                *[ Subscription-Id ]
                *[ Supported-Features ]
                [ TDF-Information ]
                [ Network-Request-Support ]
                *[ Packet-Filter-Information ]
                [ Packet-Filter-Operation ]
                [ Bearer-Identifier ]
                [ Bearer-Operation ]
                [ Framed-IP-Address ]
                [ Framed-IPv6-Prefix ]
                [ IP-CAN-Type ]
                [ 3GPP-RAT-Type ]
                [ RAT-Type ]
                [ Termination-Cause ]
                [ User-Equipment-Info ]
                [ QoS-Negotiation ]
                [ QoS-Upgrade ]
                [ Default-EPS-Bearer-QoS ]
                0*2[ AN-GW-Address ]
                [ 3GPP-SGSN-MCC-MNC ]
                [ 3GPP-SGSN-Address ]
                [ 3GPP-SGSN-IPv6-Address ]
                [ 3GPP-GGSN-Address ]
                [ 3GPP-GGSN-IPv6-Address ]
                [ RAI ]
                [ 3GPP-User-Location-Info ]
                [ 3GPP-MS-TimeZone ]
                [ Called-Station-Id ]
                [ PDN-Connection-ID ]
                [ Bearer-Usage ]
                [ Online ]
                [ Offline ]
                *[ TFT-Packet-Filter-Information ]
                *[ Charging-Rule-Report]
                *[ ADC-Rule-Report ]
                    *[ Application-Detection-Information ]
                    *[ Event-Trigger]
                    [ Event-Report-Indication]
                    [ Access-Network-Charging-Address ]
                    *[ Access-Network-Charging-Identifier-Gx ]
                    *[ CoA-Information ]
                    *[ Usage-Monitoring-Information ]
                    [ Routing-Rule-Install ]
                    [ Routing-Rule-Remove ]
                    [ Logical-Access-ID ]
                    [ Physical-Access-ID ]
                    *[ Proxy-Info ]
                    *[ Route-Record ]
                    [ SMF-Information ] +++
                    *[ UPF-Information ] +++
                    *[ AVP ]
```

The SMF-Information AVP may have the following format:

```
SMF-Information ::= < AVP Header>
                    [ SMF-Id ]
                    [ DN-Id ]
                    [ SMF-Credit-Pooling Option ]
                    [ SMF-Credit-Reservation Option ]
                    *[AVP ]
```

The UPF-Information AVP may have the following format:

```
UPF-Information ::= < AVP Header>
                    [ UPF-Id ]
                    [ DN-Id ]
                    *[ QoS-Information ]
                    *[ QoS-Flow-Identifier ]
                    *[AVP ]
```

In response to the CCR sent by SMF element 116, PCF element 118 provides an acknowledgment by sending a CCA to SMF element 116, which allow SMF element 116 to use the policy rules and correspondingly send an Sx message to UPF element 124. A CCA command from PCF element 118 to SMF element 116 may have the following format:

```
<CC-Answer> ::= < Diameter Header: 272, PXY >
                < Session-Id >
                { Auth-Application-Id }
                { Origin-Host }
                { Origin-Realm }
                [ Result-Code ]
                [ Experimental-Result ]
                { CC-Request-Type }
                { CC-Request-Number }
                *[ Supported-Features ]
                [ Bearer-Control-Mode ]
                *[ Event-Trigger ]
                [ Origin-State-Id ]
                *[ Redirect-Host ]
                [ Redirect-Host-Usage ]
                [ Redirect-Max-Cache-Time ]
                *[ Charging-Rule-Definition ] ###
                *[ Charging-Rule-Remove ]
                *[ Charging-Rule-Install ]
                *[ ADC-Rule-Remove ]
                *[ ADC-Rule-Install ]
                [ Charging-Information ]
                [ Online ]
                [ Offline ] ###
                *[ QoS-Information ] ###
                [ Revalidation-Time ]
                [ ADC-Revalidation-Time ]
                [ Default-EPS-Bearer-QoS ]
                [ Bearer-Usage ]
                [ 3GPP-User-Location-Info]
                *[ Usage-Monitoring-Information ]
                *[ CSG-Information-Reporting ]
                [ User-CSG-Information ]
                [ Error-Message ]
                [ Error-Reporting-Host ]
                *[ Failed-AVP ]
                *[ Proxy-Info ]
                *[ Route-Record ]
                *[ AVP ]
```

The Offline AVP is defined to indicate, deliver, or identify online to offline diversion. The QoS-Information AVP is defined to indicate, deliver, or identify QFI/5QI for one or more UPF elements 124. The Charging-Rule-Definition AVP is defined to indicate, deliver, or identify a Rating Group for a UPF element, and may include the following format:

```
Charging-Rule-Definition ::= < AVP Header: 1003 >
                            { Charging-Rule-Name }
                            [ Service-Identifier ]
                            [ QoS-Flow-Identifier ] +++
                            [ QFI-Validity-Timer ] +++
                            [ Rating-Group ]
                            *[ Flow-Description ]
                            [ Reporting-Level ]
                            [ Online ]
                            [ Offline ]
                            [ Metering-Method ]
                            [ Precedence ]
                            [ AF-Charging-Identifier ]
                            [ SMF-Information ] +++
                            *[ UPF-Information ] +++
                            *[ UPF Quota Distribution ] +++
                            *[ UPF Quota Criteria ] +++
                            *[ Flows ]
                            *[ AVP ]
```

The QoS-Flow-Identifier AVP is defined to indicate, deliver, or identify a QFI/5QI. The QFI-Validity-Timer AVP is defined to indicate, deliver, or identify a QFI/5QI timer. The UPF Quota Distribution AVP is defined to indicate, deliver, or identify whether a quota is for an SMF element or per UPF element. The UPF Quota Criteria AVP is defined to indicate, deliver, or identify UPF quota distribution rules, handover rules, etc.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit (s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A system comprising:
   a Session Management Function (SMF) element implemented in a control plane of a next generation network;
   the SMF element comprising:
   a first interface component configured to directly communicate with an Online Charging System (OCS);
   a second interface component configured to directly communicate with a plurality of User Plane Function (UPF) elements implemented in a user plane of the next generation network, wherein the UPF elements are provisioned by the SMF element to serve a session requested by User Equipment (UE); and
   a controller that implements a Charging Trigger Function (CTF) configured to transmit a charging request to the OCS through the first interface component requesting a quota of service units for the SMF element, and to receive a charging response from the OCS through the first interface component indicating the quota of service units granted to the SMF element by the OCS;
   the CTF is configured to manage the quota by allocating slices of the quota to the UPF elements, and to transmit messages to the UPF elements through the second interface component indicating the slices of the quota allocated to the UPF elements.

2. The system of claim 1 wherein:
   the SMF element further comprises a third interface component configured to directly communicate with a Policy Control Function (PCF) element implemented in the control plane of the next generation network; and
   the CTF is configured to transmit a policy request to the PCF element through the third interface component requesting policy rules for the session involving the UE, to receive a policy response from the PCF element through the third interface component indicating the policy rules for the session, and to allocate the slices of the quota to the UPF elements based on the policy rules.

3. The system of claim 2 wherein:
   the CTF is configured to allocate the slices of the quota to the UPF elements based on the policy rules and a history of quota consumption by each of the UPF elements.

4. The system of claim 1 wherein:
   the CTF is configured to detect a change to the plurality of UPF elements provisioned for the session, to transmit a return request through the second interface component to the UPF elements requesting return of unused service units of the slices, to add the unused service units to remaining service units of the quota, to manage the quota by allocating new slices of the remaining service units of the quota to the UPF elements, and to transmit the messages to the UPF elements through the second interface component indicating the new slices allocated to the UPF elements.

5. The system of claim 4 wherein:
   the CTF is configured to reserve a share of the quota granted by the OCS, and to add the share reserved from the quota to the remaining service units of the quota.

6. The system of claim 1 wherein:
   the CTF is configured to identify a change to a service during the session, to transmit a return request through the second interface component to the UPF elements requesting return of unused service units of the slices, to add the unused service units to remaining service units of the quota, to manage the quota by allocating new slices of the remaining service units of the quota to the UPF elements based on the change to the service, and to transmit the messages to the UPF elements through the second interface component indicating the new slices allocated to the UPF elements.

7. The system of claim 1 wherein:
   the CTF is configured to receive an update request from a UPF element of the plurality of UPF elements through the second interface component requesting a new slice, to allocate the new slice of remaining service units of the quota to the UPF element, and to transmit a return response to the UPF element through the second interface component indicating the new slice allocated to the UPF element.

8. The system of claim 1 wherein:
   the CTF is configured to determine that the quota is consumed during the session, to transmit another charging request to the OCS through the first interface component requesting a new quota of service units for the SMF element, and to receive another charging response from the OCS through the first interface component indicating the new quota of service units granted to the SMF element by the OCS.

9. A method operable in a Session Management Function (SMF) element implemented in a control plane of a next generation network, the method comprising:
   transmitting a charging request from the SMF element to an Online Charging System (OCS) requesting a quota of service units for the SMF element;
   receiving a charging response at the SMF element from the OCS indicating the quota of service units granted to the SMF element by the OCS;
   managing the quota at the SMF element by allocating slices of the quota to a plurality of User Plane Function (UPF) elements implemented in a user plane of the next generation network, wherein the UPF elements are provisioned by the SMF element to serve a session requested by User Equipment (UE); and
   transmitting messages from the SMF element to the UPF elements indicating the slices of the quota allocated to the UPF elements.

10. The method of claim 9 further comprising:
    transmitting a policy request from the SMF element to a Policy Control Function (PCF) element implemented in the control plane of the next generation network requesting policy rules for the session involving the UE; and
    receiving a policy response at the SMF element from the PCF element indicating the policy rules for the session;
    wherein allocating the slices of the quota to the UPF elements comprises allocating the slices of the quota to the UPF elements based on the policy rules.

11. The method of claim 10 wherein:
    allocating the slices of the quota to the UPF elements comprises allocating the slices of the quota to the UPF elements based on the policy rules and a history of quota consumption by each of the UPF elements.

12. The method of claim 9 further comprising:
    detecting, at the SMF element, a change to the plurality of UPF elements provisioned for the session;
    transmitting a return request from the SMF element to the UPF elements requesting return of unused service units of the slices;
    adding the unused service units to remaining service units of the quota;

managing the quota at the SMF element by allocating new slices of the remaining service units of the quota to the UPF elements; and transmitting the messages from the SMF element to the UPF elements indicating the new slices allocated to the UPF elements.

13. The method of claim 12 further comprising:

reserving, at the SMF element, a share of the quota granted by the OCS; and adding the share reserved from the quota to the remaining service units of the quota.

14. The method of claim 9 further comprising:

identifying, at the SMF element, a change to a service during the session;

transmitting a return request to the UPF elements requesting return of unused service units of the slices;

adding the unused service units to remaining service units of the quota;

managing the quota at the SMF element by allocating new slices of the remaining service units of the quota to the UPF elements based on the change to the service; and transmitting the messages from the SMF element to the UPF elements indicating the new slices allocated to the UPF elements.

15. The method of claim 9 further comprising:

receiving an update request at the SMF element from a UPF element of the plurality of UPF elements requesting a new slice;

allocating the new slice of remaining service units of the quota to the UPF element; and transmitting a return response to the UPF element indicating the new slice allocated to the UPF element.

16. The method of claim 9 further comprising:

determining, at the SMF element, that the quota is consumed during the session;

transmitting another charging request to the OCS requesting a new quota of service units for the SMF element; and receiving another charging response from the OCS indicating the new quota of service units granted to the SMF element by the OCS.

17. A non-transitory computer readable medium embodying programmed instructions executed by one or more processors, wherein the instructions direct the processors to implement:

a Session Management Function (SMF) in a control plane of a next generation network;

the SMF is configured to directly communicate with an Online Charging System (OCS), and is configured to directly communicate with a plurality of User Plane Function (UPF) elements in a user plane of the next generation network, wherein the UPF elements are provisioned by the SMF to serve a session requested by User Equipment (UE);

the SMF includes a Charging Trigger Function (CTF) configured to transmit a charging request to the OCS requesting a quota of service units for the SMF, and to receive a charging response from the OCS indicating the quota of service units granted to the SMF by the OCS;

the CTF is configured to manage the quota by allocating slices of the quota to the UPF elements, and to transmit messages to the UPF elements indicating the slices of the quota allocated to the UPF elements.

18. The non-transitory computer readable medium of claim 17 wherein:

the SMF is configured to directly communicate with a Policy Control Function (PCF) element implemented in the control plane of the next generation network; and the CTF is configured to transmit a policy request to the PCF element requesting policy rules for the session involving the UE, to receive a policy response from the PCF element indicating the policy rules for the session, and to allocate the slices of the quota to the UPF elements based on the policy rules.

19. The non-transitory computer readable medium of claim 17 wherein:

the CTF is configured to detect a change to the plurality of UPF elements provisioned for the session, to transmit a return request to the UPF elements requesting return of unused service units of the slices, to add the unused service units to remaining service units of the quota, to manage the quota by allocating new slices of the remaining service units of the quota to the UPF elements, and to transmit the messages to the UPF elements indicating the new slices allocated to the UPF elements.

20. The non-transitory computer readable medium of claim 17 wherein:

the CTF is configured to identify a change to a service during the session, to transmit a return request to the UPF elements requesting return of unused service units of the slices, to add the unused service units to remaining service units of the quota, to manage the quota by allocating new slices of the remaining service units of the quota to the UPF elements based on the change to the service, and to transmit the messages to the UPF elements indicating the new slices allocated to the UPF elements.

* * * * *